US008399105B2

(12) United States Patent
Butz et al.

(10) Patent No.: US 8,399,105 B2
(45) Date of Patent: Mar. 19, 2013

(54) POLYMER LATEX SUITABLE FOR THE PREPARATION OF DIP-MOLDED ARTICLES

(75) Inventors: Soren Butz, Dulmen (DE); Volker Erb, Dusseldorf (DE); Katja Siepen, Kurten (DE); Hans-Gunter Vogt, Dormagen (DE)

(73) Assignee: Polymer Latex GmbH & Co., KG, Marl (DE)

( * ) Notice: Subject to any disclaimer, the term of this patent is extended or adjusted under 35 U.S.C. 154(b) by 0 days.

(21) Appl. No.: 13/249,951

(22) Filed: Sep. 30, 2011

(65) Prior Publication Data

US 2012/0028525 A1  Feb. 2, 2012

Related U.S. Application Data

(63) Continuation of application No. 11/222,042, filed on Sep. 8, 2005.

(60) Provisional application No. 60/609,094, filed on Sep. 9, 2004.

(51) Int. Cl.
*B32B 27/32* (2006.01)

(52) U.S. Cl. ........ 428/521; 524/555; 524/556; 524/571; 524/575

(58) Field of Classification Search ................... 428/521; 524/555, 556, 571, 575
See application file for complete search history.

(56) References Cited

U.S. PATENT DOCUMENTS

| | | | |
|---|---|---|---|
| 2,432,353 A | 12/1947 | Talalay | |
| 3,330,795 A | 7/1967 | Schluter | |
| 3,673,133 A | 6/1972 | Schmidt | |
| 3,966,661 A | 6/1976 | Feast et al. | |
| 4,477,612 A | 10/1984 | Boutsicaris | |
| 4,537,915 A | 8/1985 | Oberle et al. | |
| 5,332,621 A | 7/1994 | Schmidt et al. | |
| 5,500,469 A | 3/1996 | Johnsen et al. | |
| 5,721,035 A | 2/1998 | Dunn | |
| 5,750,618 A | 5/1998 | Vogt et al. | |
| 5,872,189 A | 2/1999 | Bett et al. | |
| 6,391,952 B1 | 5/2002 | Bett et al. | |
| 6,579,940 B1 * | 6/2003 | Dove | 525/98 |
| 6,627,670 B2 | 9/2003 | Mork et al. | |
| 6,818,236 B2 | 11/2004 | Hill et al. | |
| 6,844,385 B1 | 1/2005 | Hagiwara et al. | |
| 6,870,019 B2 | 3/2005 | Kajiwara et al. | |
| 2002/0120025 A1 | 8/2002 | Balk et al. | |
| 2004/0030027 A1 | 2/2004 | Konno et al. | |
| 2005/0038174 A1 | 2/2005 | Suzuki | |
| 2005/0182159 A1 | 8/2005 | Udagawa et al. | |

FOREIGN PATENT DOCUMENTS

| | | |
|---|---|---|
| CN | 1426317 A | 6/2003 |
| CN | 1483058 A | 3/2004 |
| DE | 1 056 364 | 4/1959 |
| DE | 1 213 984 | 12/1963 |
| DE | 2 150 872 | 4/1973 |
| EP | 0 062 989 A2 | 10/1982 |
| EP | 0 187 905 A2 | 10/1985 |
| EP | 0 559 150 A1 | 9/1993 |
| EP | 0 753 530 A2 | 1/1997 |
| EP | 1053258 A1 | 11/2000 |
| EP | 1063258 A2 | 12/2000 |
| EP | 1209192 A1 | 5/2002 |
| EP | 1215236 A2 | 6/2002 |
| EP | 1361247 A1 | 11/2003 |
| GB | 804 208 | 11/1958 |
| GB | 1 303 045 | 1/1973 |
| GB | 1406051 A | 9/1975 |
| GB | 1546387 A | 5/1979 |
| GB | 1 253 267 | 11/1997 |
| JP | S63-243147 | 10/1988 |
| JP | H11-092595 | 4/1999 |
| JP | H11-293590 | 10/1999 |
| JP | 2001-011126 A | 1/2001 |
| JP | 2002-226508 A | 8/2002 |
| JP | 2002-241412 A | 8/2002 |
| JP | 2003-165814 | 6/2003 |
| JP | 2003-213197 A | 7/2003 |
| JP | 2003-531249 T2 | 10/2003 |
| JP | 2004-027135 A | 1/2004 |
| JP | 2004 196921 | 7/2004 |
| JP | 2004-300302 A | 10/2004 |
| KR | 2002-0093072 | 12/2002 |
| SU | 971852 A1 | 11/1982 |
| WO | WO 99/40122 A1 | 8/1999 |
| WO | WO 00/11980 A1 | 3/2000 |
| WO | WO 01/30876 A2 | 5/2001 |
| WO | WO 01/80916 A2 | 11/2001 |
| WO | WO 02/18490 A2 | 3/2002 |
| WO | WO 02/36665 A1 | 5/2002 |
| WO | WO 02/38640 A2 | 5/2002 |

(Continued)

OTHER PUBLICATIONS

Blackley, D.C., High Polymer Latices, vol. 1, 1966, pp. 69-89.
Blackley, D.C., in High Polymer Latices vol. 1, 1996; pp. 73-86.
Blackley, D.C., in *Polymer Latices—Science and Technology*, Second Edition, Chapman & Hall, New York (1997).
Encyclopedia of Polymer Science and Engineering vol. 14:719-746 1985, John Wiley & Sons, pp. 719-746.

(Continued)

*Primary Examiner* — Peter D Mulcahy
(74) *Attorney, Agent, or Firm* — Knobbe Martens Olson & Bear LLP

(57) ABSTRACT

The present invention relates to a polymer latex made by free-radical emulsion polymerization comprising polymer particles containing structural units derived from at least one conjugated diene component, whereby said polymer particles comprise at least one hard phase segment and at least one soft phase segment, wherein the polymer latex is particularly suitable for the production of dip-molded articles. Furthermore, the present invention relates to a process for making such a polymer latex, to the use of said polymer latex for the production of dip-molded articles, to a compounded polymer latex composition that is suitable for the production of dip-molded articles, to a method for making dip-molded latex articles, as well as to the latex articles obtained thereby.

17 Claims, 2 Drawing Sheets

FOREIGN PATENT DOCUMENTS

| WO | WO 02/50177 A2 | 6/2002 |
| WO | WO 03/006513 A1 | 1/2003 |
| WO | WO 03/062307 A2 | 7/2003 |
| WO | WO 03/066729 A2 | 8/2003 |

OTHER PUBLICATIONS

Hawley's Condensed Chemical Dictionary, 2002, John Wiley & Sons Inc., 14th Edition.

Maarse, et al., "Handbuch der Aroma Forschung," Akademie Verlag, Berlin, 1981.

Schnetger, J., "Lexikon der Kautcshuktechnik, 2. Auglage," 2.edition, 1991 Huthig Buch Verlag, Heidelberg.

Sakota, K. and Okaya, T. 1977 "Electrolyte stability of carboxylated latexes prepared by several polymerization processes" *J Applied Polymer Science* 21:1025-1034.

*No-Fume Ld v. Frank Pitchford & Co. Ltd.* (May 29, 1935) in Reports of Patent, Design and Trademark Cases, vol. LII, No. 7: pp. 231-253.

* cited by examiner

POLYMER LATEX SUITABLE FOR THE PREPARATION OF DIP-MOLDED ARTICLES

CROSS-REFERENCE TO RELATED APPLICATIONS

This application claims the benefit of U.S. application Ser. No. 11/222,042, filed Sep. 8, 2005, which claims priority to U.S. Provisional patent Application No. 60/609,094, filed Sep. 9, 2004, the entire disclosures of which are hereby expressly incorporated by reference.

BACKGROUND OF THE INVENTION

1. Field of the Invention

The present invention relates to a polymer latex that is particularly suitable for the production of dip-molded articles. Furthermore, the present invention relates to a process for making such a polymer latex, to the use of said polymer latex for the production of dip-molded articles, to a compounded polymer latex composition that is suitable for the production of dip-molded articles, to a method for making dip-molded latex articles, as well as to the latex articles obtained thereby.

2. Description of the Related Art

Thin wall extensible articles, such as gloves and other medical products have long been made from a natural latex polymer. Typically such articles are formed from natural rubber latex, naturally occurring emulsion of polymer and water with added stabilizing agent and vulcanizing chemicals. Additionally, in order to achieve the desired mechanical properties products made from natural rubber latex are vulcanized using a sulfur-base vulcanization system that also includes accelerators.

Such sulfur-based cure systems have been also employed for vulcanizing synthetic polymer lattices thereby introducing sulfur-based links during the crosslinking of the polymer composition. In these sulfur-based cure systems in addition to sulfur accelerators, such as amines, thiazoles, sulphenamides, dithiocarbamates and thiuram are utilized.

EP-A-1 063 258 relates to a latex composition for dip molding wherein C8-22 fatty acids or salts thereof are incorporated as bubble breakers. This latex composition is vulcanized using additional sulfur based vulcanization systems in order to produce the dip molded products.

Similarly EP-A-559 150 discloses a copolymer latex suitable for dip molding whereby the latex is vulcanized by a traditional sulfur vulcanization system.

EP-A-753 530 relates to a different technology. Herein a polymer latex is described having segments of different glass transition temperature. This polymer latex is used for making mattresses whereby traditional sulfur containing vulcanization systems are used. This application does not relate to dip molding.

Recently it has been discovered that latex articles made either of natural rubber lattices or of synthetic rubber lattices using sulfur-based cure systems may induce allergenic reactions of the type IV.

Since one important field of application for natural and synthetic rubber articles is, for example, medical gloves or condoms that inevitably will come in contact with the skin of the wearer and due to the increasing susceptibility to allergenic reactions of people in modern society it has been a long-felt need in industry to provide synthetic rubber compositions that can be formed into dip-molded articles, like medical gloves, that do not induce allergenic reactions or liberate compounds that may induce other health risks, like for example nitrosamine without compromising the desired and necessary properties of these products, like mechanical strength, elasticity. Furthermore, it is especially or medical gloves desired that they possess adequate esthetic properties with respect to drape, softness and tactility. Furthermore it is most important for these products that they provide a good barrier to microbial penetration and are substantially impermeable to a variety of liquids and gases. Therefore, in addition to the desired mechanical properties it is also important that the final product has a uniform film thickness.

In the prior art several approaches to substitute a sulfur-based curing system containing accelerators were discussed in order to avoid allergenic reactions caused by the rubber articles.

WO 00/11980 describes synthetic rubber lattices and aqueous polyurethane dispersions having very low glass transition temperatures that are crosslinked by means other than sulfur vulcanization of double bonds. Particularly the synthetic rubber should be substantially free of carbon-carbon unsaturation. Thus no diene component shall be used. However, diene monomers can be used as long as sulfur vulcanization is not applied for crosslinking the resultant rubber. The polymers described therein are capable to be crosslinked using external crosslinkers. Suitable crosslinking functionalities in the polymers are hydroxyl or carboxyl groups. But nevertheless external crosslinkers are necessary that have a potential not to be bound to the polymer and therefore to bloom out to the surface of the polymer in the final product, and therefore in itself may cause health risks, especially in view of the selections of crosslinking agents disclosed in that reference.

An alternative solution to avoid sulfur-based vulcanization systems containing also accelerators has been described in WO 02/50177. Herein metal oxide cros slinking agents are used for cros slinking the synthetic polymers. Suitable examples are zinc oxide, magnesium oxide or cadmium oxide.

A similar solution has been suggested in WO 02/38640 disclosing rubber compositions containing chelating monomers that can be crosslinked with polyvalent metal ions. A suitable chelating monomer is an acetoacetoxy functionalized monomer.

EP-A-1 361 217 discloses a polymer latex composition for dip molding comprising a carboxylated conjugated diene based rubber latex having according to the examples a single glass transition temperature whereby crosslinking is achieved by the presence of multivalent cations.

WO 03/006513 discloses latex formulations comprising a base polymer having carboxylate groups, a divalent or trivalent metal, an amine or amino compound and a neutralizing agent in an amount sufficient to neutralize at least a portion of the carboxylate groups in the base polymer.

WO 03/062307 discloses a polymer latex composition. The polymer particles thereof can be made of different segments having different glass transition temperatures. These compositions are either used as coating composition or as a component of a coagulant for a dip molding process. But in both cases this composition only forms a coating and the bulk material of the dip molded article is a conventional sulfur vulcanized polymer latex. It is essential to the invention described in WO 03/062307 that the polymer latex having segments of different glass transition temperature is stabilized using polyvinyl alcohol. Such systems are extremely stable against electrolytes which also can be seen from the embodiments where this latex is used in combination with a coagulant. Even in this coagulation composition the latex remains stable which is a clear indication that the latex has extremely high resistance to coagulation due to the presence of polyvinyl alcohol as stabilizer. For the bulk material of the dip molded articles a conventional sulfur cured polymer latex is used. The objective solved by the approach disclosed in WO 03/062307 is to reduce the stickiness of the inner and outer surface of the glove. Therefore it is also only necessary to use the particular polymer latex described in WO 03/062307 as a coating whereas the bulk material of the dip molded article is still a conventional sulfur vulcanized polymer latex. Therefore also the latex used for the coating does not need to fulfill the tensile strength requirement for dip molded articles.

Other solutions to avoid sulfur-based vulcanization systems containing accelerators for crosslinking synthetic or natural rubber lattices in order to produce health care products still employ additional cros slinking agents. These are either organic molecules having a functionality adapted to react with the cros slinking functionality in the rubber component or polyvalent metal salts. Thus the rubber compositions still have to be compounded with the crosslinking agent which results in a complicated process for making the latex compound. In this process the relative amounts have to be carefully adjusted in order to achieve the desired crosslinking density, and if possible to bind all the additional crosslinkers into the final molecule to avoid blooming out of crosslinker component that in itself again may create a health risk. Furthermore, especially when using polyvalent metal ions as crosslinking agent latex instability during the compounding process may occur which makes the compounding process particularly difficult. Furthermore the crosslinking agents, especially the polyvalent ions, reduce the stability of the latex compound and therefore the ability to store the already compounded latex composition prior to its use in a dip-molding process for making the medical care product. Furthermore, especially the introduction of polyvalent metal ions as crosslinking system in rubber compositions may increase environmental hazards.

WO 02/18490 discloses a different approach wherein a hydrogenated tri-block copolymer containing, for example, styrene-ethylene/propylene-styrene segments which do not contain double bonds, is mixed with a cyclic unsaturated polyolefin crystalline polymer. This polymer composition is not a latex and the articles made of this composition have to be extruded. Furthermore still crosslinking is necessary to obtain the desired mechanical properties of the final product. Crosslinking can be achieved either by physical means, like radiation, or by chemical means, like peroxides and usual vulcanization systems, as disclosed above.

From WO 01/30876 substitutes for natural or synthetic rubber lattices are disclosed that can be used to make medical care products. Thermoplastic elastomeric tri-block polymers comprising two polystyrene hard domains and one polyolefin rubber domain are prepared by using living anionic polymerization. The resultant polymer, due to the use of butadiene or isoprene, in the polyolefin rubber domain, still have double bonds available for crosslinking. Typical crosslinking processes disclosed in WO 01/30876 are radiation or chemical vulcanization processes using well-known sulfur/accelerator systems.

Consequently the elastomeric polymers to be used or making medical care products according to the teaching of both latter prior art documents have the disadvantage that still crosslinking is necessary. Either a complex radiation curing has to be employed which in itself is a health hazard, or traditional vulcanization systems that suffer from the drawbacks as discussed above, have to be applied. Finally conventional dip-molding processes cannot be applied using these polymer systems in order to make the desired products.

U.S. Pat. No. 5,500,469 describes a thermally gellable artificial latex composition useful for preparing articles such as gloves, condoms or balloons that are free of vulcanizing agents and proteins. The polymer of the artificial latex is a preformed multiblock copolymer prepared by anionic polymerization in solvents. Due to the anionic polymerization process the number of monomers which can be used for block copolymerization is very limited. U.S. Pat. No. 5,500,469 describes only multiblocks consisting of a combination of type A block consisting of alkenyl aromatic hydrocarbons and type B block consisting of a conjugated diene. The block copolymers are dissolved in non polar hydrocarbon solvents up to a total solids of 20 to 50% of the organic phase. After adding a sulfate of an ethoxylated phenol as surfactant and water the hydrocarbon has to be completely removed by distillation. This means high volumes of organic solvents in relation to the polymer weight have to be handled. The limited versatility in respect of suitable monomers for the anionic block copolymerization process is another disadvantage of the teaching in U.S. Pat. No. 5,500,469.

In other fields of technology that do not relate to dip molded articles polymer latex lattices having segments of different Tg's are known. These lattices can, for example, be used as coating material whereby in these applications coagulation should be avoided under any circumstances since this would be detrimental to the desired coating properties.

For example, U.S. Pat. No. 5,872,189 discloses water-redispersible powders based on a polymer latex having "core/shell" structure with different glass transition temperatures. The key point of this invention is the redispersibility in water which can only be achieved if the latex is stabilized against coagulation. Consequently such a latex cannot be used in dip molding, and it is explicitly disclosed that these redispersible powders can be suitably used in the building industry as additives for hydraulic mineral binders for the production of protective and decorative coatings and of adhesive mortars and adhesive cements. Consequently vulcanization of these systems is no issue at all.

Similarly JP-A-2002-226508 relates to a paper coating composition wherein also electrolyte stability is of uppermost importance since otherwise no stable coating composition for paper coating can be obtained. Furthermore, like in U.S. Pat. No. 5,872,189 vulcanization of the latex is no issue for a latex used in paper coating compositions.

SUMMARY OF THE INVENTION

Thus it is the object of the present invention to provide a polymer latex that can be compounded into latex compositions that have a long-term stability and can be used for conventional dip-molding processes for making latex articles whereby no crosslinking either by radiation or by crosslinking agents in the compounded composition is necessary to achieve the desired mechanical properties of the final latex product thereby avoiding the above described deficiencies of the prior art.

This object has been solved by a polymer latex made by free radical emulsion polymerization comprising polymer particles containing structural units derived from at least one conjugated diene component whereby said polymer particles comprise at least one hard phase segment having a glass transition temperature ($T_g$) of at least 50° C. and at least one soft phase segment having a glass transition temperature ($T_g$) of 10° C. at most, the total amount of hard phase segments being 2 to 40 wt-% and the total amount of the soft phase segments being 60 to 98 wt-% based on the total weight of the polymer particles, whereby the $T_g$ is measured by DSC according to ASTM D3418-03 and said polymer latex having an electrolyte stability determined as critical coagulation concentration of less than 30 mmol/l $CaCl_2$ (determined for a total solids content of the latex of 0.1% at pH 10).

Furthermore the present invention relates to a method for making a polymer latex comprising polymerizing in an emulsion polymerization process in presence of a free-radical initiator, stabilizers and water a first ethylenically unsaturated monomer or mixture of monomers that results in a hard phase segment having a glass transition temperature ($T_g$) of at least 50° C. and thereafter polymerizing a second monomer or mixture of monomers that results in a soft phase segment having a glass transition temperature ($T_g$) of 10° C. at most or vice versa in amounts so that the total amount of hard phase segments is 2 to 40 wt-% and the total amount of the soft phase segments is 60 to 98 wt-% based on the total weight of the polymer, whereby the $T_g$ is measured by DSC according to ASTM D3418-03 with the proviso that at least one conjugated diene is employed in the polymerization process and the amount of stabilizers is adjusted to obtain an electrolyte stability determined as critical coagulation concentration of less than 30 mmol/l $CaCl_2$ (determined for a total solids content of the latex of 0.1% at pH 10).

Furthermore, the present invention relates to a compounded polymer latex composition that is suitable for the production of dip-molded articles and comprises the polymer latex as defined above.

Although the compounded polymer latex composition may comprise usual crosslinking and vulcanization systems it is particularly preferred if the polymer latex composition is free of sulfur and accelerators for sulfur vulcanization. It is even more preferred if the polymer latex composition in addition is also substantially free of polyvalent cations and other chemical crosslinkers.

The present invention also relates to a method for making dip-molded latex articles by:
  (a) immersing a mold having the desired shape of the final article in a coagulant bath comprising a solution of a metal salt;
  (b) removing the mold from the bath and optionally drying the mold;
  (c) immersing the mold as treated in step (a) and (b) in the compounded latex composition of the present invention;
  (d) removing the mold from the latex composition and optionally immersing the latex coated mold in a water bath;
  (e) optionally drying the latex coated mold;
  (f) heat treating the latex coated mold obtained from step (d) or (e) at a temperature of 80 to 180° C.; and
  (g) removing the latex article from the mold,
and to latex articles that are made of the polymer latex according to the present invention.

In addition to dip-molding applications the polymer latex of the present invention can also be used for coating and impregnating of all kind of substrates. The present polymer latex is particularly suitable for impregnating and coating of textile substrates.

DETAILED DESCRIPTION OF THE PREFERRED EMBODIMENT

Figure 1:
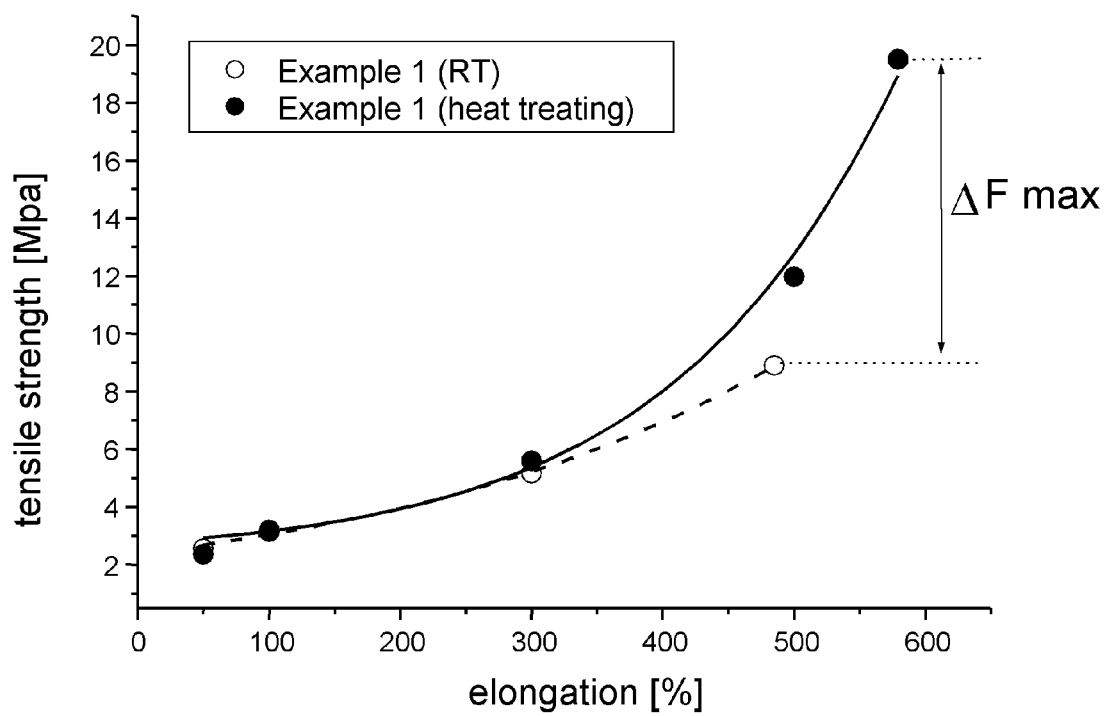
FIG. 1. Dipped polymer films. Increase of tensile strength as function of heat treating. Definition of ΔF max see in Example 1.

It is a surprising result of the present invention that a polymer latex made by free radical emulsion polymerization can be formulated into a compounded latex composition that is substantially free of usual crosslinking and vulcanization compounds but nevertheless after forming and heat-treating the latex articles exhibits all the desired properties that are necessary for medical applications. The final products have the desired mechanical properties like tensile strength and elongation and the desired esthetic properties described above very similar to the products obtained by using typical crosslinking or vulcanization systems.

Furthermore the polymer latex according to the present invention can be successfully used in usual dip-molding processes of making latex products in that in the dip-molding process a continuous film of the polymer latex composition can be deposited onto the mold immersed into the compounded latex composition, thereby resulting in substantially uniform film thickness of the final product which is also an important requirement, especially for medical applications.

An important feature in order to achieve the above discussed desired result according to the present invention is that the polymer latex of the present invention comprises polymer particles having at least one hard phase segment having a glass transition temperature ($T_g$) of at least 50° C. and at least one soft phase segment having a glass transition temperature ($T_g$) of 10° C. at most. In the context of the present invention the term "segment" shall be understood as a polymer block that is an integral part of the entire polymer molecule. Consequently the polymer molecule(s) forming the polymer particles of the latex has hard segments and soft segments that are to some extent bonded to each other, for example, by means of a covalent bond. Thus the polymer particles of the present invention are not mixtures of polymers having different $T_g$'s but according to a preferred embodiment of the present invention, for example the soft segment is grafted by means of covalent bonds onto the hard segment, or vice versa.

According to preferred embodiments of the present invention the $T_g$ of the hard phase segment in the polymer particles is at least 70° C., preferably at least 80° C., and most preferred at least 90° C.

The soft phase segment of the polymer particles according to the present invention may have a $T_g$ of 0° C. at most, preferably −10° C. at most, more preferred −20° C. at most, and most preferred −30° C. at most.

The $T_g$ of the at least two different segments of the polymer particles of the present invention can be easily determined using differential scanning calorimetry (DSC) according to ASTM D3418-03.

The polymer latex according to the present invention comprises a total amount of hard phase segments of 2-40 weight percent and a total amount of soft phase segments of 6-98 weight percent, based on the total weight of the polymer particles. According to a preferred embodiment the total amount of hard phase segments is 5-30 weight percent and the total amount of the soft phase segments is 70-95 weight percent. It is most preferred if the total amount of hard phase segments is 10-25 weight percent and the total amount of soft phase segments is 75-90 weight percent, whereby the weight percentages are based on the total weight of the polymer particles.

Although according to the present invention single soft phase and/or hard phase segments may be constituted by homo-polymer blocks it is preferred that at least the soft phase segment(s) is(are) constituted by copolymer blocks, particularly copolymer blocks that contain in addition to structural units derived from at least one conjugated diene structural units that are derived from at least one other ethylenically unsaturated co-monomer. In a particularly preferred embodiment the soft phase and the hard phase segments are constituted by copolymer blocks. Most preferably, if copolymer blocks are present either as soft phase segment or hard phase segment or both these copolymer blocks are random copolymer blocks. These copolymer blocks can be easily prepared by free-radical emulsion polymerization in a great versatility. Thus, it is a particular advantage of the present invention that the latex polymer can by easily tailored to the specific needs of the particular end use.

It is well known to a person skilled in the art how to adjust the $T_g$ of the hard phase segment or the soft phase segment by selecting a monomer or a mixture of monomers that result in the desired $T_g$ in the polymerization process. For example, the $T_g$'s of the homopolymers of a wide range of monomers are disclosed in J. Brandrup, E. H. Immergut (eds.), Polymer Handbook, Second Edition, Wiley, New York, 1975

For random copolymers the $T_g$ depends on the weight fractions of the component monomers and the $T_g$'s of the component homopolymers. A rough correlation is described by the Fox equation:

$$1/T_g = w_1/T_{g1} + w_2/T_{g2} + \ldots$$

where $w_1, w_2, \ldots$ are the weight fractions of the component monomers and $T_{g1}, T_{g2}, \ldots$ are the $T_g$'s of the component homopolymers in ° K. The Fox equation allows a first orientation for the $T_g$ of a copolymer. For the resulting real $T_g$'s also further parameters of the used monomers and the process have an important influence. Therefore physical methods for the determination of the $T_g$ like the DSC method are still necessary.

It is within the routine of a person skilled in the art to select in the copolymerization process, as will be discussed below, certain monomers or mixture of monomers that give rise to a hard segment or a soft segment in the appropriate amounts in order to obtain a polymer particle within the ranges of $T_g$ for the hard segments and the soft segments as well as the relative amounts of both segments, as specified above for the present invention.

The polymer particles of the present invention contain structural units derived from conjugated dienes.

Particularly preferred dienes are butadienes, isoprene and chloroprene having a $T_g$ of −83° C, −72° C and −45° C, respectively. Examples for other soft monomers are ethylene ($T_g$ −80° C), octyl acrylate ($T_g$ −65° C), butyl acrylate ($T_g$ −54° C), ethyl acrylate ($T_g$ −24° C).

Examples of hard monomers are isobutyl methacrylate ($T_g$+55° C), acrylonitrile ($T_g$+100° C), styrene ($T_g$+100° C), methyl methacrylate ($T_g$+105° C).

Furthermore, for the soft segment a mixture of soft and hard monomers can be used as long as the $T_g$ of the entire soft segment is within the given ranges. The same applies for the hard segment.

In addition to the above exemplified monomers also all other monomers known to a person skilled in the art having an α,β-unsaturated group can be used according to the present invention.

Since the conjugated dienes, as exemplified above, have a very low $T_g$ the conjugated dienes are preferably used in the soft phase segment of the polymer particles according to the present invention.

According to a preferred embodiment of the present invention the soft phase segments contain independently from each other structural units derived from the group consisting of conjugated dienes; ethylenically unsaturated mono-carboxylic acids; ethylenically unsaturated di-carboxylic acids, anhydrides, mono-esters and mono-amides thereof; (meth)acryl nitrile; styrene; substituted styrenes; alpha-methyl styrene; C1 to C10 esters of (meth)acrylic acid; amides of (meth) acrylic acid; ethylenically unsaturated compounds comprising N-methylol amide groups, and ester and ether derivatives thereof; and mixtures thereof.

Likewise, according to a preferred embodiment of the present invention the hard phase segments contain independently from each other structural units derived from monomers selected from the group consisting of ethylenically unsaturated mono-carboxylic acids; unsaturated di-carboxylic acids, anhydrides, mono-esters and mono-amides thereof; (meth)acryl nitrile; styrene; substituted styrenes; alpha-methyl styrene; C1 to C4 esters of (meth)acrylic acid; amides of (meth)acrylic acid; and mixtures thereof.

According to a particularly preferred embodiment of the present invention the polymer particles of the inventive latex are carboxylated whereby the carboxyl-functional structural units may be either present in the soft phase segment or in the hard phase segment, or both.

By adjusting the carboxylation grade of the polymer particles of the present invention an optimum balance between tensile strength and elasticity of the final product can be achieved.

Without wanting to be bound by theory it is believed that the carboxyl groups in the polymer particles may function as possible crosslinking sites whereby the amount of metal cations in the coagulation bath the dip-mold is immersed prior to immersing into the compounded polymer latex composition is already sufficient in order to induce crosslinking in order to increase the tensile strength of the final product. But contrary to the teaching of the prior art, as discussed above, the presence of additional polyvalent metal cations in the compounded polymer latex composition is not necessary. The desired degree of tensile strength in the final product can be even achieved without the presence of carboxylic groups in the polymer particles.

Suitable carboxyl-functional monomers that can be used according to the present invention are the monocarboxylic acids, like acrylic acid or methacrylic acid, crotonic acid, vinyl acetic acid, sorbic acid or ethylenically unsaturated dicarboxylic acids, like fumaric acid or maleic acid, or the anhydride monoesters or monoamides thereof, like acrylamide and methacrylamide.

According to another embodiment of the present invention the polymer particles may contain functional groups that are capable of self-crosslinking upon heat treatment. Examples of groups capable of self-crosslinking are selected from N-methylol amide groups, and ester and ether derivatives thereof; and mixtures thereof. These groups can be introduced into the polymer particles of the present invention by using ethylenically unsaturated monomers containing these functional groups. Preferred monomers are N-methylol acrylamide, N-methylol methacrylamide, N-methoxymethyl-(meth)acrylamide, N-n-butoxy-methyl-(meth)acrylamide, N-acetoxymethyl-(meth)acrylamide, N(-2,2-dimethoxy-1-hydroxyethyl)acrylamide.

Furthermore ethylenically unsaturated monomers with sulfonic acid or sulfonate groups can be used. Examples are styrene sulfonic acid, vinyl sulfonic acid, allyl sulfonic acid, methallyl sulfonic acid, (meth)acrylic acid-3-sulfopropylester, 2-acrylamido-2-methylpropane sulfonic acid. Beside these sulfonic acids also their water soluble salts can be used. Preferred are (meth)acrylic acid-3-sulfopropylester, 2-acrylamido-2-methylpropane sulfonic acid Another important property of the polymer latex of the present invention is that it can be compounded to a polymer latex composition that is suitable for dip-molding processes. For this application it is important that the polymer latex has a certain maximum electrolyte stability determined as critical coagulation concentration of less than 30 mmol/l $CaCl_2$ (determined for a total solids content of the latex of 0.1% at pH 10).

If the electrolyte stability is too high then it is difficult to coagulate the polymer latex in a dip-molding process with the result that either no continuous film of the polymer latex on the immersed mold is formed or the thickness of the resulting product is non-uniform.

It is within the routine of the person skilled in the art to appropriately adjust the electrolyte stability of a polymer latex. The electrolyte stability will depend on certain different factors, for example, amount and selection of monomers to be used for making the polymer latex, especially monomers containing polar-functional groups, as well as the selection and amount of the stabilizing system, for example, the emulsion polymerization process for making the polymer latex. The stabilizing system may contain surface-active agents and/or protective colloids.

A person skilled in the art is able, depending on the selected monomers and their relative amounts for making the polymer latex of the present invention, to adjust the stabilizing system in order to achieve an electrolyte stability according to the present invention.

Since there are so many different influences on the electrolyte stability the adjustment has to be made by trial and error experiments. But this can be easily done without any inappropriate efforts using the test method for electrolyte stability, as disclosed above.

Furthermore the working examples below provide examples how the appropriate electrolyte stability of the polymer latex of the present invention can be adjusted.

The polymer latex of the present invention can be prepared by a conventional emulsion polymerization process using multistep or multisequential polymerization in order to obtain the segments of different $T_g$.

In the process according to the present invention first a selected monomer or mixture of monomers in order to obtain either a hard phase segment or a soft phase segment are polymerized in presence of a free radical-forming activator, an emulsifier and in presence of water. Thereafter a second monomer or mixture of monomers that results in a hard phase if the first segment was a soft phase, or vice versa, is polymerized in the same reaction mixture. Thereby a multistep or multisequential copolymerization takes place. It is also possible to introduce into the polymer particles more than one hard and/or more than one soft segment. Thereby it is not important in which sequence the hard and soft segments are polymerized. For example, it is also within the present invention to first polymerize two or more soft or hard segments and thereafter at least one of the respective other segments. It is, of course, also possible to polymerize hard and soft segments in an alternative sequence.

It is only important that there is at least one hard and at least one soft segment in the relative amounts, as discussed above with respect to the present invention.

According to one preferred embodiment first a hard phase segment is polymerized, followed by a soft phase segment and then again a hard phase segment is polymerized.

It is also possible in the polymerization process of the present invention to use a seed latex for polymerization of the first segment, irrespective of whether it is a hard or a soft segment, in order to adjust the desired particle size. The seed suitable according to the invention consists of, for example, lattices based on the lattices to be produced according to the present invention. Alternatively, also the seed may be a latex containing only monomers that would constitute either a hard segment or a soft segment of the latex of the present invention. But it is also possible to use a seed latex that is totally different from the latex according to the present invention, as long as the desired particle size is obtained.

The particle size of the initially introduced seed is preferably in the range from 10-80 nm, even more preferred in the range from 20-50 nm.

Inorganic pigments whose particles can act as seeds for the subsequent polymerization can also be used as seed in the process according to the invention. Pigments having an average particle size of 5-100 nm, such as silica sole, are for example suitable.

The quantity of the seed to be used depends on the size of the latex to be produced and is usually 0.01-5 weight percent, preferably 0.1-2 weight percent, based on the total amount of monomers used in the polymerization process.

Free radical initiators which may be used in the process according to the present invention are, for example, inorganic peroxy compounds, such as hydrogen peroxide, sodium, potassium and ammonium peroxydisulfate, peroxycarbonates and peroxyborates, as well as organic peroxy compounds, such as alkyl hydroperoxides, dialkyl peroxides, acyl hydroperoxides, and diacyl peroxides, as well as esters, such as tertiary butyl perbenzoate and combinations of inorganic and organic initiators. The quantities of initiators are usually within the range of 0.01-5 weight percent, based on the total amount of monomers used, preferably in the range of 0.05-2.0 weight percent. The above mentioned inorganic and organic peroxy compounds may also be used in a known manner in combination with one or more suitable reducing agents. Examples of such reducing agents which may be mentioned are sulfur dioxide, alkali metal disulfites, alkali metal and ammonium hydrogen sulfites, thiosulfates, dithionites and formaldehyde sulfoxylates, as well as hydroxylamine hydrochloride, hydrazine sulfate, iron (II) sulfate, glucose and ascorbic acid. The quantity of the reducing agent is 0.01-1.0 weight percent, based on the total weight of monomers.

The most suitable initiator or initiator system may be determined by means of preliminary tests. Suitability is in particular dependent upon the nature of the used monomers and the polymerization reaction temperature.

It is frequently advisable to perform the emulsion polymerization additionally in the present of buffer substances and chelating agents. Suitable substances are, for example, alkali metal phosphates and pyrophosphates (buffer substances) and the alkali metal salts of ethylenediaminetetraacetic acid (EDTA) as chelating agents. The quantity of buffer substances and chelating agents is usually 0.01-1 weight percent, based on the total quantity of monomers.

Furthermore, it may be advantageous to use chain transfer agents (regulator) in emulsion polymerization. Typical agents are, for example, organic sulfur compounds, such as $C_1$-$C_{12}$ alkyl mercaptans, n-dodecylmercaptan and t-dodecylmercaptan being preferred. The quantity of chain transfer agents, if present, is usually 0.05-3.0 weight percent, preferably 0.2-2.0 weight percent, based on the total weight of the used monomers.

It is also significant in the emulsion polymerization according to the invention that the addition of the necessary stabilizer and/or emulsifier is controlled to achieve the desired particle size and sufficient stabilization to avoid agglomeration during the polymerization process, but also to achieve a electrolyte stability as required by the present invention. The emulsifiers are known and are commonly used in emulsion polymerization (D. C. Blackley, Emulsion Polymerization, Chapter 7, Applied Science Publishers Ltd. London 1975).

Emulsifiers which may be used according to the invention are in particular so-called anionic emulsifiers, such as high fatty alcohol sulfates, higher alkyl sulfonates, alkyl aryl sulfonates, aryl sulfonates together with the condensation products thereof with formaldehyde, salts of sulfosuccinic acid esters and sulfate ethylene oxide adducts. Preferably the polymer latex of the present invention is free of sulfates of an ethoxylated phenol.

So-called non-ionic emulsifiers may also be mentioned, such as for example, the known reaction products of ethylene oxide with fatty alcohols, such as lauryl, myristyl, cetyl, stearyl and oleyl alcohols with fatty acids such as lauric, mauristic, palmitic, stearic and oleic acid and amides thereof, and with alkyl phenyl such as isooctyl, isononyl and dodecyl phenol.

The total quantity of emulsifiers or stabilizers to be used is calculated such that the latex is stabilized during polymerization in such a manner that no coagulate is formed but that on the other hand the required electrolyte stability of the final polymer latex as required by the present invention is achieved.

In polymerizing the different segments of the polymer particles of the present invention the first segment to be polymerized can be polymerized in a batch or in a semicontinous modus, irrespective of whether it is a soft phase segment or hard phase segment. The second segment may be polymerized using a semicontinous process. Alternatively it is also possible to polymerize all segments either using a batch process or a semicontinous process or it is alternatively possible to use a batch process or a semicontinous process for the polymerization of the individual segments in any desired sequence.

The polymer latex of the present invention is particularly suitable for dip-molding processes. Therefore, according to one aspect of the present invention the polymer latex is compounded to produce a polymer latex composition that can be directly used in dip-coating processes. To get reproducible good physical film properties, the pH of the compounded polymer latex composition has to be adjusted by pH modifiers to be in the range of pH 7 to 11, preferably 8 to 10. The compounded polymer latex composition contains the polymer latex of the present invention, the pH modifiers, preferably ammonia or alkali hydroxides and usual additives to be used in these compositions selected from antioxidants, pigments, $TiO_2$, fillers and dispersing agents.

It is possible to use in the compounded polymer latex compositions according to the present invention to be used in dip-molding processes conventional vulcanization systems, like sulfur in combination with accelerators, like thiurams and carbamates and zinc oxide. But since these components are not necessary according to the present invention to achieve the desired mechanical and esthetic properties of the final product but may create problems with respect to allergenic reactions and other health hazards, and in addition lead to an increased complexity in the compounding process the compounded latex composition of the present invention is preferably free of these components.

Furthermore the compounded polymer latex composition of the present invention does not need a crosslinker component, like for example, polyvalent cations or other polyfunctional organic compounds suitable to react with functional groups on the latex particles in order to achieve chemical crosslinking. Consequently the latex compositions according to the present invention are preferably substantially free of crosslinker components, especially of polyvalent cations. By the term "substantially free" is meant that, for example, polyvalent metal cations may be present at an impurity level, for example that is introduced without intention due to a possible impurity of other components, to make either the latex or the latex composition. For example total polyvalent metal ions at an impurity level may be present in a concentration of less than 1 mmol/l, preferably less than 0.5 mmol/l, more preferred less than 0.3 mmol/l and most preferred less than 0.2 mmol/l.

In the method for making dip-molded latex articles according to the present invention first a mold having the desired shape of the final article is immersed in a coagulant bath comprising a solution of a metal salt. The coagulant is usually used as a solution in water, an alcohol or a mixture thereof. As specific examples of the coagulant the metal salts can be metal halides like calcium chloride, magnesium chloride, barium chloride, zinc chloride and aluminum chloride; metal nitrates such as calcium nitrate, barium nitrate and zinc nitrate; metal sulfates like calcium sulfate, magnesium sulfate, and aluminum sulfate; and acetic acid salts such as calcium acetate, barium acetate and zinc acetate. Most preferred are calcium chloride and calcium nitrate. The coagulant solution might contain additives to improve the wetting behavior of the former Thereafter the mold is removed from the bath and optionally dried. The such treated mold is then immersed in the compounded latex composition according to the present invention. Thereby a thin film of latex is coagulated on the surface of the mold. Thereafter the mold is removed from the latex composition and optionally immersed in a water bath in order to extract, for example, polar components from the composition and to wash the coagulated latex film.

Thereafter the latex coated mold is optionally dried at temperature below 80° C.

Finally the latex coated mold is heat treated at a temperature of 80-180° C. in order to obtain the desired mechanical properties for the final film product. Then the final latex film is removed from the mold. The duration of the heat treatment will depend on the temperature and is typically between 1 and 60 minutes. The higher the temperature the shorter is the required treatment time.

The final heat treated polymer latex film has a tensile strength of at least about 7 MPa and an elongation at break of at least about 300%, preferably a tensile strength of at least about 10 MPa, an elongation at break of at least about 350% and more preferred a tensile strength of at least about 15 MPa and an elongation at break of at least about 400%. These mechanical properties were measured according to ISO 37:1994.

Preferably, a polymer latex film according to the present invention exhibits an increase in tensile strength of at least 2 MPa, preferably at least 4 MPa, more preferred at least 5 MPa, most preferred at least 6 MPa after heat treatment at 120° C. for 30 minutes compared to the identical polymer latex film kept at 25° C. (room temperature).

This process can be used for any latex article that can be produced by a dip-molding process known in the art.

The present invention is especially applicable for dip-molded latex articles selected from health care devices, like surgical gloves, examination gloves, condoms, catheters or all different kinds of industrial and household gloves.

A particular advantage of the compounded latex composition of the present invention is that no kind of crosslinkers is necessary and is preferably not present in the compounded latex composition. The lack of polyvalent metal cations above the impurity level, as discussed above, leads to a considerably increased stability of the compounded latex composition leading to an increased pot life. This will add flexibility to the preparation process. Furthermore, since only few components in addition to the polymer latex are necessary to compound the latex composition of the present invention, also the preparation of this composition is much easier compared to prior art compositions, especially it is not necessary any longer to exactly determine and measure the amounts of crosslinkers, accelerators, etc.

The present invention will be further illustrated with reference to the following examples.

EXAMPLE 1

55 g of a 31% seed latex (particle size 36 nm) are heated to 40° C. in a nitrogen-purged autoclave with 750 g of water, 2 g Na dodecyl benzene sulfonate, 0.5 g of $Na_4EDTA$, 0.05 g of Na formaldehyde sulfoxylate, 0.8 g of t-butyl hydroperoxide and an increment of the hard phase monomers mixture consisting of 94.3 g methylmethacrylate and 4.0 g methacrylic acid was added. After 1 h of polymerization an increment of following soft phase monomer/chain transfer agent mixture consisting of 270 g acrylo nitrile, 36 g methacrylic acid, 579 g butadiene, and 9 g t-dodecylmercaptan was added. Over a period of 7 hours an emulsifier/co-activator feed of 22.5 g Na dodecyl benzene sulfonate, 0.7 g Na formaldehyde sulphoxylate, and 300 g water was added. After a total polymerization time of 12 hours the total solids content was 48.0% corresponding to a conversion of 98%. The polymerization was short stopped by addition of 20 g of a 5% aqueous solution of diethylhydroxylamine. The pH was adjusted by ammonia to pH 7.5 and the residual monomers were removed by vacuum distillation at 60° C.

EXAMPLE 2

55 g of a 31% seed latex (particle size 36 nm) are heated to 40° C. in a nitrogen-purged autoclave with 750 g of water, 2 g Na dodecyl benzene sulfonate, 0.5 g of $Na_4EDTA$, 0.05 g of Na formaldehyde sulphoxylate, 0.8 g of t-butyl hydroperoxide. For the hard phase a feed consisting of 66 g styrene, 28 g acrylonitrile and 4.0 g methacrylic acid was added within 1 hour. After 2 h of polymerization a feed of following soft phase monomer/chain transfer agent mixture consisting of 270 g acrylonitrile, 36 g methacrylic acid, 579 g butadiene, and 9 g t-dodecylmercaptan was added within a period of 5 hours. Parallel to the soft phase monomer feed over a period of 10 hours an emulsifier/co-activator feed of 22.5 g Na dodecyl benzene sulfonate, 0.7 g Na formaldehyde sulfoxylate, and 300 g water was added. After a total polymerization time of 15 hours the total solids content was 48.2% corresponding to a conversion of 98%. The polymerization was short stopped by addition of 20 g of a 5% aqueous solution of diethylhydroxylamine. The pH was adjusted by ammonia to pH 7.5 and the residual monomers were removed by vacuum distillation at 60° C.

EXAMPLE 3

The polymerization was carried out like in Example 2 but for the hard phase a feed consisting of 80 g methylmethacrylate, 14 g butylacrylate and 4.0 g methacrylic acid was added within 1 hour.

After a total polymerization time of 15 hours the total solids content was 47.6% corresponding to a conversion of 97%. The polymerization was short stopped by addition of 20 g of a 5% aqueous solution of diethylhydroxylamine. The pH was adjusted by ammonia to pH 7.5 and the residual monomers were removed by vacuum distillation at 60° C.

EXAMPLE 4

1800 g of a carboxylated NBR latex (Perbunan N Latex VT-LA, 45%, from Polymer Latex) was heated together with 200 g additional water to 60° C. in a nitrogen purged vessel and an increment of 190 g methylmethacrylate was added. The mixture was equilibrated for 1 hour and then the polymerization was started by addition of 0.8 g of t-butyl hydroperoxide and 0.8 g of Na formaldehyde sulfoxylate dissolved in 20 g of water. After 5 hours the conversion was nearly 100%. The pH was adjusted by ammonia to pH 7.5 and the residual monomers were removed by vacuum.

Film preparation (dipped films): The pH was adjusted to 9.7 ($NH_3$) and the latex was diluted to a TSC of 33%. The dipping was performed using unglazed porcelain plates as moulds. As coagulant a calcium nitrate solution with a density of 1.21 g/ccm at 60° C. was applied. The coagulant dip (3 sec) was followed by the latex dip (30 sec.) and by air drying (1 minute) and finally by a leaching of 20 min. After the leaching a heat treating at 120° C. (30 min) was performed.

Film preparation (dried Films): The latex films were prepared by a drying at room temperature. Followed by a heating at 40° C.

Film Testing/results: The physical film properties of the dipped polymer films were tested according to the ISO 37:1994. FIG. 1 exemplary the characteristic temperature impact (120° C. 30 min) on the tensile strength. The increase of the tensile strength is defined as ΔF max according to the drawing. Table 1 summarizes this ΔF max values for the examples 1-4. The results are compared with one vulcanized dipping latex as control experiment. The characteristic behavior of the inventive latex compounds is clearly demonstrated. Only the inventive latex compounds/latex films shows an significant tensile strength increase.

Figure 2:
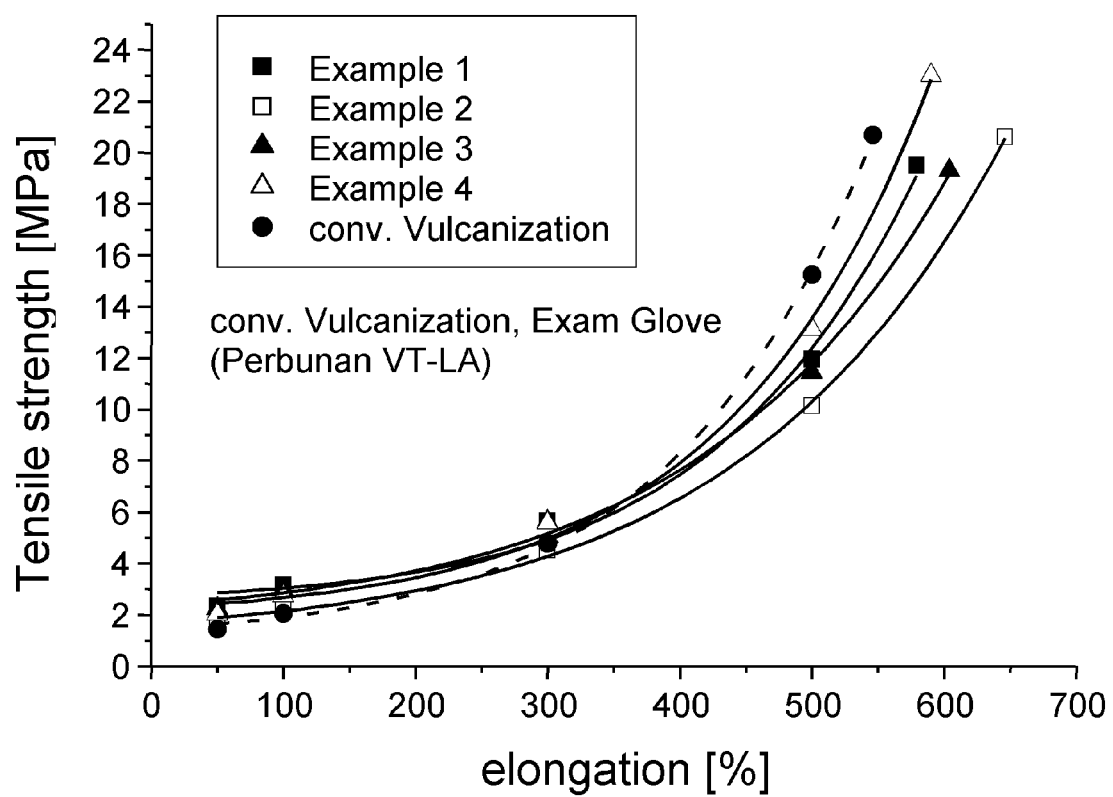
FIG. 2. Comparison of physical film properties. The polymer films of Examples 1 to 4 were dipped without any curing agents according to the description. Curing paste of the conventional vulcanization: 1 phr ZnO, 1 phr Sulfur, 1 phr LDA, pH: 9.7 ($NH_3$).

FIG. 2 compares the physical properties of examples 1-4 (heat treated) with a vulcanized Latex film, prepared from a typical dipping latex. It is obvious, that the inventive latex compositions/latex films realize the physical film performance of conventional vulcanisates, but without any curing chemicals.

TMA/results: Measurement of dried Latex films. The polymer film is placed between two quartz discs and the penetration of a needle (1 mm diameter) was followed using a force of 0.5 N at a heating rate of 5° K/min over a temperature range from −50 to +150° C. The penetration is calculated in % of the used film thickness. The D 100 values are defined by the needle penetration in % at 100° C. When the upper temperature of 150° C. was reached, the temperature was kept at 150° C. for 5 min, then the sample was cooled down to −50° C., the needle was placed at a different part of the film surface and a second temperature run was started under the same conditions. The ΔD 100 value is calculated by: D 100 of the first temperature run minus the D 100 of a second temperature run, therefore a ΔD 100 value >0 represent a increase of the film hardness as function of the heat treatment. Tab. 2 summarizes the ΔD 100 results of examples 1-4 and of one control experiment. The characteristic behavior of the inventive latex compositions is obvious. Only the inventive latex compositions/latex films show the characteristic film hardening as function of the heat treatment.

TABLE 1

Quantification of the tensile strength increase by ΔFmax

| | Example | | | | |
|---|---|---|---|---|---|
| | Example 1 | Example 2 | Example 3 | Example 4 | Control[1] |
| ΔFmax [MPa] | 10.6 | 11.3 | 6.0 | 10.0 | 0 |

[1]Perbunan VT-LA using the same film preparation (no vulcanization)

TABLE 2

Decrease of the $D_{100}$ value (TMA) as function of heat treating. The $\Delta D_{100}$ value is calculated as difference from the first and the second TMA run.

| | Example | | | | |
|---|---|---|---|---|---|
| | Example 1 | Example 2 | Example 3 | Example 4 | Control[2] |
| $\Delta D_{100}$ [%] | 9 | 9 | 11 | 18 | 0 |

[2]Perbunan VT-LA using the same film preparation (no vulcanization)

Influence of electrolyte stability: The impact of the electrolyte stability of the polymer latex of the present invention is demonstrated by Table 3. The electrolyte stability is determined as critical coagulation concentration (ccc) for a total solids content of the latex of 0.1% at pH 10 and room temperature. Under these conditions the latex is titrated with a 2.0 mol/l solution of calcium chloride (adjusted to pH 10) and the turbidity of the latex was followed by photometric measurement using a Mettler Phototrode DP550 as a function of calcium chloride concentration. The ccc is taken from the inflection point of the turbidity/electrolyte concentration curve. The results are shown in Table 3. The film preparation was performed according to the description using unglazed porcelain plates as molds and an aqueous calcium nitrate solution with a density of 1.21 g/ccm at 60° C. as coagulant.

Only the examples 1-4 and the control 1 (commercially available X-NBR with low ccc) can be processed by the described coagulation process leading to uniform polymer films, while the control 2 (commercially available X-NBR Latex with high ccc) shows only an inhomogeneous, partial coagulation leading to non-uniform polymer films.

TABLE 3

Critical coagulation concentration and coagulant dipping behavior

| Example | Example 1 | Example 2 | Example 3 | Example 4 | Control 1* | Control 2** |
|---|---|---|---|---|---|---|
| CCC [mmol/l $CaCl_2$] | 10 | 9 | 12 | 12 | 6 | >100 |
| Results of coagulant dipping | Uniform Polymer Films | Uniform Polymer Films | uniform polymer films | uniform polymer films | uniform polymer films | Incomplete Coagulation none uniform polymer films |

*Perbunan N Latex VT-LA (from PolymerLatex)
**Perbunan N Latex 3415M (from PolymerLatex)

What is claimed is:

1. A dip molded article comprising a film made from a polymer latex comprising polymer particles containing structural units derived from at least one conjugated diene component, whereby said polymer particles comprise at least one hard phase segment having a glass transition temperature (Tg) of at least 50° C. and at least one soft phase segment having a glass transition temperature (Tg) of 10° C at most, the total amount of hard phase segments being 2 to 40 wt-% and the total amount of the soft phase segments being 60 to 98 wt-% based on the total weight of the polymer particles, whereby the Tg is measured by DSC according to ASTM D3418-03 and said polymer latex having an electrolyte stability determined as critical coagulation concentration of less than 30 mmol/l $CaCl_2$ (determined for a total solids content of the latex of 0.1% at pH 10).

2. An article comprising a film made from a polymer latex comprising polymer particles containing structural units derived from at least one conjugated diene component, whereby said polymer particles comprise at least one hard phase segment having a glass transition temperature (Tg) of at least 50° C and at least one soft phase segment having a glass transition temperature (Tg) of 10° C at most, the total amount of hard phase segments being 2 to 40 wt-% and the total amount of the soft phase segments being 60 to 98 wt-% based on the total weight of the polymer particles, whereby the Tg is measured by DSC according to ASTM D3418-03 and said polymer latex having an electrolyte stability determined as critical coagulation concentration of less than 30 mmol/l $CaCl_2$ (determined for a total solids content of the latex of 0.1% at pH 10), wherein the latex article is selected from the group consisting of surgical gloves, examination gloves, condoms, catheters and industrial and household gloves.

3. An article comprising a substrate coated or impregnated by a film made from a polymer latex comprising polymer particles containing structural units derived from at least one conjugated diene component, whereby said polymer particles comprise at least one hard phase segment having a glass transition temperature (Tg) of at least 50° C and at least one soft phase segment having a glass transition temperature (Tg) of 10° C at most, the total amount of hard phase segments being 2 to 40 wt-% and the total amount of the soft phase segments being 60 to 98 wt-% based on the total weight of the polymer particles, whereby the Tg is measured by DSC according to ASTM D3418-03 and said polymer latex having an electrolyte stability determined as critical coagulation concentration of less than 30 mmol/l $CaCl_2$ (determined for a total solids content of the latex of 0.1% at pH 10).

4. An article according to claim 3 wherein the substrate is a textile material.

5. The dip molded article of claim 1, wherein the total amount of hard phase segments is between 5 and 30 wt-% and the total amount of the soft phase segments is between 70 and 95 wt-%, the weight percentages being based on the total weight of the polymer particles.

6. The dip molded article of claim 1, wherein the total amount of hard phase segments is 10 to 25 wt-% and the total amount of the soft phase segments is 75 to 90 wt-%, the weight percentages being based on the total weight of the polymer particles.

7. The dip molded article of claim 1, wherein the soft phase segments contain independently from each other structural units derived from monomers selected from the group consisting of conjugated dienes; ethylenically unsaturated mono-carboxylic acids; ethylenically unsaturated di-carboxylic acids, anhydrides, mono-esters and mono-amides thereof; (meth)acryl nitrile; styrene; substituted styrenes; alpha-methyl styrene; C1 to C10 esters of (meth)acrylic acid; amides of (meth)acrylic acid; ethylenically unsaturated compounds comprising N-methylol amide groups, and ester and ether derivatives thereof.

8. The dip molded article of claim 1, wherein the hard phase segments contain independently from each other structural units derived from monomers selected from the group consisting of ethylenically unsaturated mono-carboxylic acids; unsaturated di-carboxylic acids, anhydrides, mono-esters and mono-amides thereof; ethylenically unsaturated compounds comprising N-methylol amide groups, and ester and ether derivatives thereof; and mixtures thereof; (meth)acryl nitrile; styrene; substituted styrenes; alpha-methyl styrene; C1 to C8 esters of (meth)acrylic acid; amides of (meth)acrylic acid; and mixtures thereof.

9. The dip molded article of claim 1, wherein the film has an electrolyte stability determined as critical coagulation concentration of less than 25 mmol/l $CaCl_2$ determined for a total solids content of the latex of 0.1% at pH 10.

10. The dip molded article of claim 9, wherein the film has an electrolyte stability determined as critical coagulation concentration of less than 20 mmol/l $CaCl_2$ determined for a total solids content of the latex of 0.1% at pH 10.

11. The dip molded article of claim 1, wherein the polymer particles comprise groups that are capable of self-crosslinking.

12. The dip molded article of claim 11, wherein the groups capable of self-crosslinking are selected from N-methylol amide groups and their ester and ether derivatives thereof; and mixtures thereof.

13. The dip molded article of claim 12, wherein said groups capable of self-crosslinking are selected from N-methylol acrylamide, N-methylol methacrylamide, N-methoxymethyl-(meth)acrylamide, N-n-butoxy-methyl-(meth)acrylamide, N-acetoxymethyl-(meth)acrylamide, and N(-2,2-dimethoxy-l-hydroxyethyl) acrylamide.

14. The dip molded article of claim 1, wherein said polymer latex is carboxylated.

15. The dip molded article of claim 14, wherein the soft phase segment or the hard phase segment or both are carboxylated.

16. The dip molded article of claim 1, wherein the film exhibits an increase in tensile strength of at least 2 MPa after heat treatment at 120° C. for 30 minutes compared to the identical polymer latex film kept at 25° C.

17. The dip molded article of claim 1, wherein the film is heat treated and has a tensile strength of at least about 7 MPa and an elongation at break of at least about 300% measured according to ISO 37:1994.

* * * * *